(12) United States Patent　　　　　　(10) Patent No.: US 12,566,142 B2

Gondaira　　　　　　　　　　　　　　　(45) Date of Patent: Mar. 3, 2026

(54) OPTICAL APPARATUS AND EXAMINATION APPARATUS

(71) Applicant: Lasertec Corporation, Yokohama (JP)

(72) Inventor: Ko Gondaira, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 139 days.

(21) Appl. No.: 18/510,000

(22) Filed: Nov. 15, 2023

(65) Prior Publication Data

US 2024/0159684 A1　　May 16, 2024

(30) Foreign Application Priority Data

Nov. 15, 2022　(JP) ................................. 2022-182206

(51) Int. Cl.
*G01N 21/88* 　　　　(2006.01)
*G01N 21/93* 　　　　(2006.01)

(52) U.S. Cl.
CPC ......... *G01N 21/8806* (2013.01); *G01N 21/93* (2013.01); *G01N 2021/8835* (2013.01)

(58) Field of Classification Search
CPC .. G01M 11/00; G01M 11/02; G01M 11/0207; G01N 2021/8835; G01N 2021/933; G01N 2021/936; G01N 21/84; G01N 21/88; G01N 21/8806; G01N 21/93; F03F 7/208
See application file for complete search history.

(56) References Cited

U.S. PATENT DOCUMENTS

| | | | | |
|---|---|---|---|---|
| 4,253,764 A | * | 3/1981 | Morrill | ...................... G01J 1/42 |
| | | | | 356/225 |
| 5,331,409 A | * | 7/1994 | Thurtell | ................. G01N 21/39 |
| | | | | 356/440 |
| 5,347,298 A | * | 9/1994 | Gokita | ............... G06K 15/1219 |
| | | | | 347/133 |
| 5,475,617 A | * | 12/1995 | Castonguay | ............. G02B 6/04 |
| | | | | 385/115 |

(Continued)

FOREIGN PATENT DOCUMENTS

| | | | |
|---|---|---|---|
| JP | 2013524217 A | | 6/2013 |
| JP | 6462843 B1 | | 1/2019 |
| WO | 2011123469 A1 | | 10/2011 |

OTHER PUBLICATIONS

Japan Patent Office, Office Action Issued in Application No. 2022-182206, Sep. 10, 2024, 8 pages.

*Primary Examiner* — Georgia Y Epps

(74) *Attorney, Agent, or Firm* — McCoy Russell LLP

(57)　　　　　　ABSTRACT

An optical apparatus and an examination apparatus that are capable of improving thermal stability are provided. An optical apparatus according to the present disclosure includes a housing that includes an optical member and on which light is incident, and a control unit configured to control, in a case in which power of incident light incident on the housing changes, the incident light after the change so that energy calculated by integrating the power after the change over a predetermined time becomes equal to energy calculated by integrating the power before the change over the predetermined time. The case in which the power of the incident light changes may include stop and resumption of incidence of the incident light.

21 Claims, 5 Drawing Sheets

1

(56)     References Cited

U.S. PATENT DOCUMENTS

| | | | | |
|---|---|---|---|---|
| 6,567,171 | B1 * | 5/2003 | Rushing | G01N 21/5907 |
| | | | | 399/49 |
| 6,825,936 | B2 * | 11/2004 | Metcalfe | G01B 11/04 |
| | | | | 250/214 R |
| 9,500,469 | B2 * | 11/2016 | Atwell | H04N 25/589 |
| 11,213,186 | B2 * | 1/2022 | Ito | G06T 7/0012 |
| 2002/0060795 | A1 * | 5/2002 | Metcalfe | G01B 11/04 |
| | | | | 356/625 |
| 2011/0234790 | A1 | 9/2011 | True | |
| 2015/0015898 | A1 * | 1/2015 | Atwell | G01B 5/008 |
| | | | | 356/625 |
| 2016/0169661 | A1 * | 6/2016 | Atwell | G01B 5/008 |
| | | | | 356/601 |
| 2016/0353070 | A1 * | 12/2016 | Okamoto | H04N 9/3182 |
| 2019/0204235 | A1 | 7/2019 | Nishizawa et al. | |
| 2020/0037849 | A1 * | 2/2020 | Ito | A61B 1/000096 |
| 2024/0159684 | A1 * | 5/2024 | Gondaira | G01N 21/01 |

* cited by examiner

OPTICAL APPARATUS AND EXAMINATION APPARATUS

CROSS REFERENCE TO THE RELATED APPLICATION

This application is based upon and claims the benefit of priority from Japanese patent application No. 2022-182206, filed on Nov. 15, 2022, the disclosure of which is incorporated herein in its entirety by reference.

BACKGROUND

The present disclosure relates to an optical apparatus and an examination apparatus.

Japanese Patent No. 6462843 discloses an optical apparatus configured to emit pulse light by performing pulse oscillation operation.

SUMMARY

In an optical apparatus including a light source of a laser beam or the like in pulse oscillation, operation that light emission is temporarily stopped and then resumed is repeated in some cases. For example, in an exposure apparatus including a CCD, exposure light is stopped in synchronization with transfer from the CCD after exposure. In this manner, in a case in which light emission and non-light emission such as stop are repeated, temperature change occurs to each component of an optical apparatus including an optical path due to difference in the existence of drive current and light between light emission and non-light emission. When the time ratio of light emission and non-light emission is constant, a quasi-stationary state can be obtained and temperature can be stabilized. However, when the time ratio of light emission and non-light emission changes, the stable temperature changes and it becomes difficult to maintain thermal stability of the optical apparatus.

The present disclosure is intended to solve such a problem and provide an optical apparatus and an examination apparatus that are capable of improving thermal stability.

An optical apparatus according to the present disclosure includes a housing that includes an optical member and on which light is incident, and a control unit configured to control, in a case in which power of incident light incident on the housing changes, the incident light after the change so that energy calculated by integrating the power after the change over a predetermined time becomes equal to energy calculated by integrating the power before the change over the predetermined time.

In the above-described optical apparatus, the case in which the power of the incident light changes may include stop and resumption of incidence of the incident light, the incident light before the change has the power of a constant value over the predetermined time, and the control unit may control the incident light after the change so that energy calculated by integrating the power of the incident light including the stop and the resumption over the predetermined time becomes equal to energy calculated by integrating the constant value over the predetermined time.

In the above-described optical apparatus, right after the resumption of the incident light, the control unit may add the constant value to the power of the incident light for a time equal to a stop time for which the stop of the incident light is executed.

In the above-described optical apparatus, in the predetermined time since the stop after the resumption of the incident light, the control unit may add the power calculated by multiplying the constant value by a certain number to the power of the incident light for a time calculated by dividing a stop time for which the stop of the incident light is executed by the certain number.

The above-described optical apparatus may further include a light source configured to generate the incident light, and an additional light source different from the light source and configured to generate additional light to be added to the power of the incident light.

In the above-described optical apparatus, the incident light may be pulse light including a pulse train with which a plurality of pulses are repeatedly incident, and right after the resumption, the control unit may add the power corresponding to decrease of the power right before the resumption from the constant value.

In the above-described optical apparatus, right after the resumption, the control unit may add the power corresponding to decrease from the constant value by increasing intensity of the pulse train.

In the above-described optical apparatus, right after the resumption, the control unit may add the power corresponding to decrease from the constant value by increasing repetition frequency of the pulse train.

In the above-described optical apparatus, the control unit may control the predetermined time including the stop and the resumption.

The above-described optical apparatus may further include a recording unit configured to record a parameter such as the power of the incident light after the change in association with the power before the change, and the control unit may control the incident light after the change based on the parameter recorded in the recording unit.

The above-described optical apparatus may further include a temperature sensor configured to detect temperature inside the housing, and the control unit may control the incident light after the change based on the temperature detected by the temperature sensor.

An examination apparatus according to the present disclosure includes the above-described optical apparatus and examines an examination target with the incident light.

According to the present disclosure, it is possible to provide an optical apparatus and an examination apparatus that are capable of improving thermal stability.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION OF EMBODIMENTS

Specific configurations of embodiments of the present disclosure will be described below with reference to the accompanying drawings. The following description presents preferable embodiments of the present disclosure, and the scope of the present disclosure is not limited to the embodiments described below. In the following description, elements denoted by the same reference sign have the same contents in effect.

First Embodiment

Figure 1:
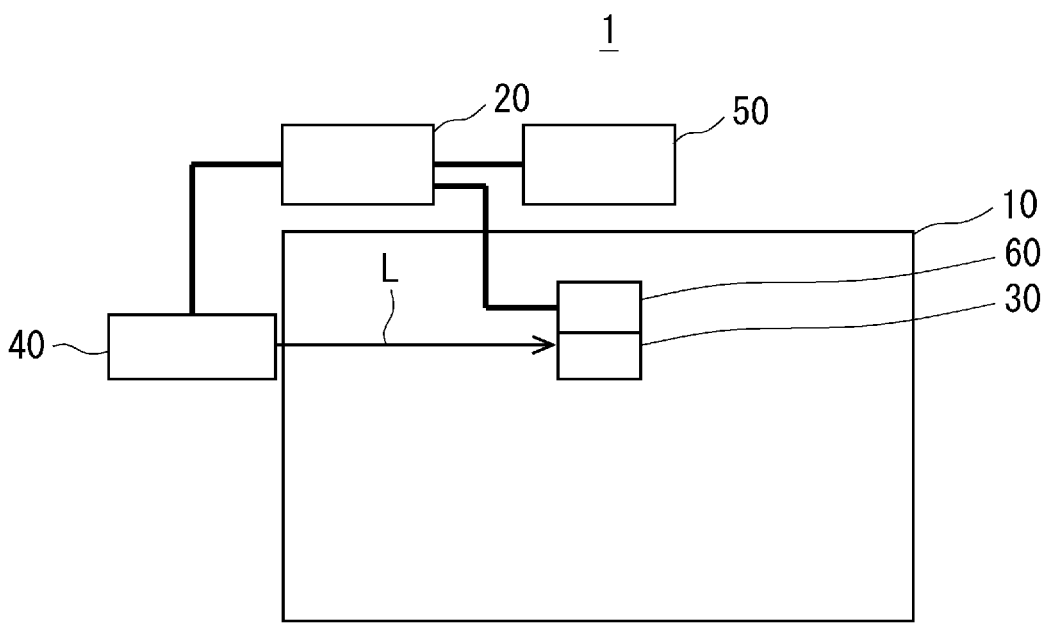
FIG. 1 is a configuration diagram exemplarily illustrating an optical apparatus according to a first embodiment.

An optical apparatus according to a first embodiment will be described below. FIG. 1 is a configuration diagram exemplarily illustrating the optical apparatus according to the first embodiment. As illustrated in FIG. 1, an optical apparatus 1 includes a housing 10 and a control unit 20. The optical apparatus 1 may further include a light source 40, a recording unit 50, and a temperature sensor 60. The light source 40 and the recording unit 50 may be provided separately from the optical apparatus 1, and the temperature sensor 60 may be not provided at the optical apparatus 1. The optical apparatus 1 is, for example, an examination apparatus configured to examine an examination target. The optical apparatus 1 is not limited to such an examination apparatus as long as the optical apparatus 1 includes the housing 10 and the control unit 20, and may be a measurement apparatus configured to measure a measurement target, an image capturing apparatus configured to capture an image of an image capturing target, an exposure apparatus configured to expose an exposure target, a fabrication apparatus configured to fabricate a fabrication target, or the like.

The housing 10 includes an optical member 30 inside. The optical member 30 is, for example, a mirror, a mirror holder, a lens, a lens holder, or a stage but is not limited thereto. The housing 10 is a space on which light L is incident from the light source 40. The inside of the housing 10 may be a space containing predetermined gas or may be a space at low pressure such as vacuum. The housing 10 may include the temperature sensor 60 configured to measure temperature. The temperature sensor 60 measures at least one of temperature of an optical path inside the housing 10 and temperature of the optical member 30. At least one of the temperature of the optical path of the housing 10 and the temperature of the optical member 30, which is measured by the temperature sensor 60 is referred to as the temperature inside the housing 10.

The control unit 20 controls the incident light L incident on the housing 10 from the light source 40. The control unit 20 controls, for example, power of the incident light L. In a case in which the incident light L is pulse light including a plurality of pulses, the control unit 20 may control repetition frequency of the pulse light. The control unit 20 may control the incident light L by directly controlling light emission, oscillation, and the like at the light source 40 or may control the incident light L by controlling an adjustment apparatus configured to adjust the power and the repetition frequency of light emitted from the light source 40.

Figure 2:
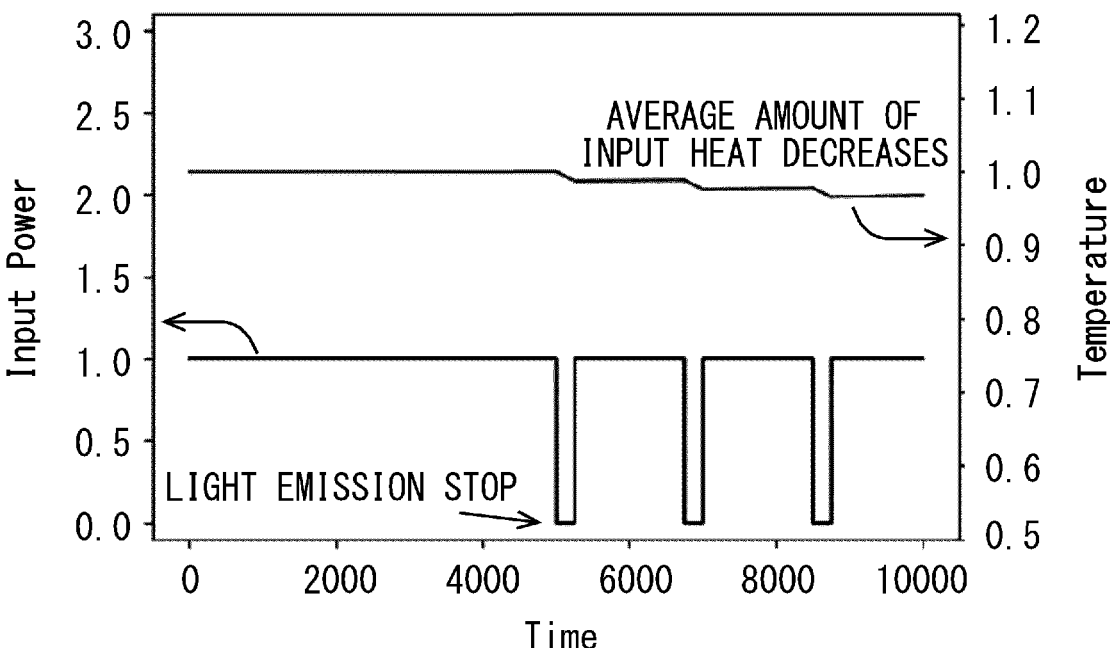
FIG. 2 is a graph exemplarily illustrating input power and temperature in a case in which a control unit does not perform incident light control in the optical apparatus according to the first embodiment, a horizontal axis representing time, a vertical axis on a left side representing the power of incident light incident on a housing, a vertical axis on a right side representing the temperature inside the housing.

FIG. 2 is a graph exemplarily illustrating input power and temperature in a case in which the control unit 20 does not perform control of the incident light L in the optical apparatus 1 according to the first embodiment, a horizontal axis representing time, a vertical axis on a left side representing the power of the incident light L incident on the housing 10, a vertical axis on a right side representing the temperature inside the housing 10. Time (referred to as t in some cases), power (referred to as P in some cases), and temperature (referred to as T in some cases) are each normalized with a particular value.

As illustrated in FIG. 2, for example, the incident light L with power P=1.0 at a constant value is incident on the housing 10 until t=5000. A constant value includes not only a precisely constant value but also a constant value including inevitable measurement error.

At t=5000, the power of the incident light L changes. Specifically, at t=5000, the power of the incident light L changes from P=1.0 to P=0.0. Then, from t=5000, stop and resumption of the incident light L are repeated. Accordingly, the power of the incident light L repeats P=0.0 and P=1.0.

For example, in the interval of 250 at t=5000 to 5250, light emission is stopped and incidence of the incident light L is stopped. In the interval of 1500 at t=5250 to 6750, incidence of the incident light L is resumed and the incident light L with power P=1.0 is incident.

In the interval of 250 at t=6750 to 7000, light emission is stopped and incidence of the incident light L is stopped. In the interval of 1500 at t=7000 to 8500, incidence of the incident light L is resumed and the incident light L with power P=1.0 is incident. In the interval of 250 at t=8500 to 8750, light emission is stopped and incidence of the incident light L is stopped.

The temperature inside the housing 10 decreases each time incidence of the incident light L is stopped. For example, the temperature inside the housing 10 before change of the power of the incident light L is defined to be 1.0. Specifically, the temperature inside the housing 10 when the incident light L is incident is defined to be 1.0. The temperature inside the housing 10 gradually decreases after change of the power of the incident light L.

For example, in the interval of 250 at t=5000 to 5250, the temperature inside the housing 10 decreases from T=1.0 by 0.01. In the interval of 250 at t=6750 to 7000, the temperature inside the housing 10 decreases from T=0.99 by 0.01. In the interval of 250 at t=8500 to 8750, the temperature inside the housing 10 decreases from T=0.98 by 0.01. Accordingly, the temperature inside the housing 10 decreases by 0.01 each time incidence of the incident light L stops.

Figure 3:
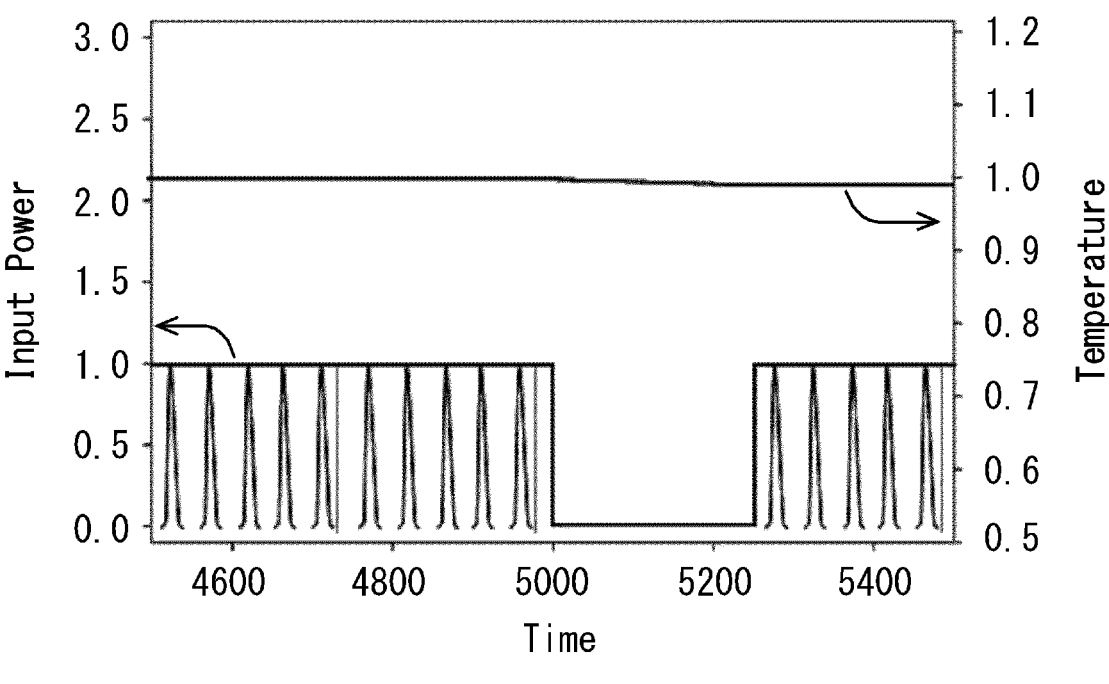
FIG. 3 is a graph exemplarily illustrating input power and temperature in the case in which the control unit does not perform incident light control in the optical apparatus according to the first embodiment, and is a diagram enlarging a vicinity of t=5000 in FIG. 2 and additionally including a pulse train included in incident light.

FIG. 3 is a graph exemplarily illustrating input power and temperature in the case in which the control unit 20 does not perform control of the incident light L in the optical apparatus according to the first embodiment, and is a diagram enlarging a vicinity of t=5000 in FIG. 2 and additionally including a pulse train included in the incident light L. As illustrated in FIG. 3, the incident light L is, for example, pulse light including a pulse train with which a plurality of pulses are repeatedly incident. The case in which the power of the incident light L changes includes stop and resumption of incidence of the incident light L including a pulse train. In the interval of 250 at t=5000 to 5250, incidence of a pulse train is stopped. From t=5250, incidence of a pulse train is resumed. In the interval of 250 at t=5000 to 5250, the temperature inside the housing 10 decreases from T=1.0 by 0.01. In this manner, in the case in which the control unit 20 does not perform control of the incident light L, an amount of input heat decreases in accordance with a ratio of a stop time of incidence of the incident light L. Control of the incident light L includes correction of parameters such as the power and repetition frequency of the incident light L. Specifically, control of the incident light L includes correction of parameters such as the intensity and the repetition frequency of a pulse train included in the incident light L. In the case in which the control unit 20 does not perform control of the incident light L, after change of the power of the incident light L, energy calculated by integrating the power of the incident light L including the power change over a predetermined time is different from energy calculated by integrating the power of the incident light L before the change of the power of the incident light L over a predetermined time. The predetermined time before the change and the predetermined time after the change have the same time length. The same time length means not only a precisely same time length but also the same time length including inevitable measurement error.

For example, energy calculated by integrating the power of the incident light L including change of the power of the incident light L over the interval of 1750 at t=5000 to 6750 after the change is different from energy calculated by integrating the power of the incident light L before the change of the power of the incident light L over the interval of 1750 at t=3250 to 5000.

Accordingly, the temperature inside the housing 10 changes through change of the power of the incident light L. Specifically, temperature change occurs to each component including an optical path due to difference in the existence of drive current and light between light emission and non-light emission. When the time ratio of light emission and non-light emission is constant, a quasi-stationary state can be obtained and the temperature can be stabilized. However, when the time ratio of light emission and non-light emission changes, the stable temperature changes and thermal stability of the optical apparatus 1 cannot be maintained.

Figure 4:
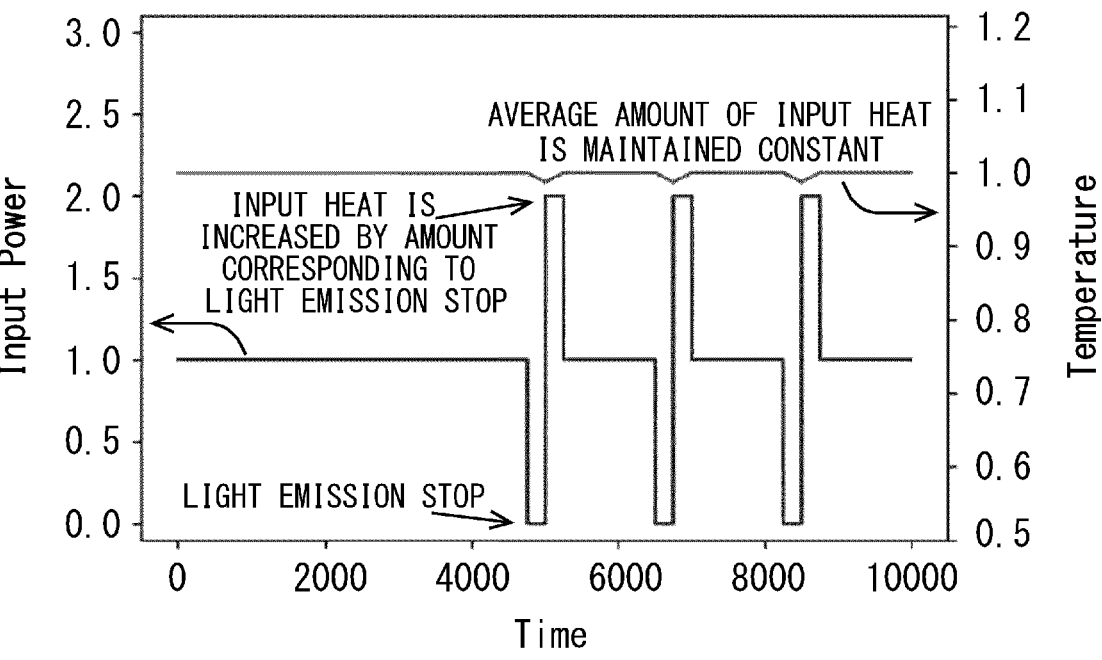
FIG. 4 is a graph exemplarily illustrating input power and temperature in a case in which the control unit performs incident light control in the optical apparatus according to the first embodiment, a horizontal axis representing time, a vertical axis on a left side representing the power of incident light incident on the housing, a vertical axis on a right side representing the temperature inside the housing.

FIG. 4 is a graph exemplarily illustrating input power and temperature in a case in which the control unit 20 performs control of the incident light L in the optical apparatus 1 according to the first embodiment, a horizontal axis representing time, a vertical axis on a left side representing the power of the incident light L incident on the housing 10, a vertical axis on a right side representing the temperature inside the housing 10.

As illustrated in FIG. 3, for example, until t=4750, the incident light L with power P=1.0 at a constant value is incident on the housing 10. At t=4750, the power of the incident light L changes. Specifically, at t=4750, the power of the incident light L changes from P=1.0 to P=0.0. Then, from t=4750, stop and resumption of the incident light L are repeated.

For example, in the interval of 250 at t=4750 to 5000, light emission is stopped and incidence of the incident light L is stopped. In the interval of 250 at t=5000 to 5250, incidence of the incident light L is resumed and the incident light L with power P=2.0 is incident to compensate the stop of light emission. In the interval of 1250 at t=5250 to 6500, the incident light L with power P=1.0 is incident.

In the interval of 250 at t=6500 to 6750, light emission is stopped and incidence of the incident light L is stopped. In the interval of 250 at t=6750 to 7000, incidence of the incident light L is resumed and the incident light L with power P=2.0 is incident to compensate the stop of light emission. In the interval of 1250 at t=7000 to 8250, incidence of the incident light L is resumed and the incident light L with power P=1.0 is incident.

In the interval of 250 at t=8250 to 8500, light emission is stopped and incidence of the incident light L is stopped. In the interval of 250 at t=8500 to 8750, incidence of the incident light L is resumed and the incident light L with power P=2.0 is incident to compensate the stop of light emission. In the interval of 1250 at t=8750 to 10000, the incident light L with power P=1.0 is incident.

The temperature inside the housing 10 decreases each time the incident light L is stopped. However, the temperature inside the housing 10 returns to the original temperature each time incidence of the incident light L is resumed and the incident light L with power P=2.0 is incident to compensate the stop of light emission.

For example, the temperature inside the housing 10 before change of the power of the incident light L is defined to be 1.0. Specifically, the temperature inside the housing 10 when continuous light is incident is defined to be 1.0. The temperature decreases by 0.1 with stop of the incident light L in the interval of 250 at t=4750 to 5000. However, the temperature increases by 0.1 with incidence of the incident light L with power P=2.0 in the interval of 250 at t=5000 to 5250 right after resumption of incidence. Accordingly, the temperature inside the housing 10 returns to the original temperature T=1.0. Then, the temperature inside the housing 10 is maintained at T=1.0 with incidence of the incident light L with power P=1.0 in the interval of 1250 at t=5250 to 6500.

Similarly, the temperature decreases by 0.1 with stop of the incident light L in the interval of 250 at t=6500 to 6750. However, the temperature increases by 0.1 with incidence of the incident light L with power P=2.0 in the interval of 250 at t=6750 to 7000 right after resumption of incidence. Accordingly, the temperature inside the housing 10 returns to the original temperature T=1.0. Then, the temperature inside the housing 10 is maintained at T=1.0 with incidence of the incident light L with power P=1.0 in the interval of 1250 at t=7000 to 8250.

The temperature decreases by 0.1 with stop of the incident light L in the interval of 250 at t=8250 to 8500. However, the temperature increases by 0.1 with incidence of the incident light L with power P=2.0 in the interval of 250 at t=8500 to 8750 of right after resumption of incidence. Accordingly, the temperature inside the housing 10 returns to the original temperature T=1.0. Then, the temperature inside the housing 10 is maintained at T=1.0 with incidence of the incident light L with power P=1.0 in the interval of 1250 at t=8750 to 10000.

In this manner, in the case in which the control unit 20 controls the incident light L, an average amount of input heat is maintained constant, and thus the temperature inside the housing 10 is maintained constant. Specifically, in a case in which the power of the incident light L incident on the housing 10 changes, the control unit 20 controls the incident light L after the change so that energy calculated by integrating the power after the change over a predetermined time becomes equal to energy calculated by integrating the power before the change for the predetermined time. Accordingly, energy calculated by integrating the power including the power change after the change over the predetermined time is equal to energy calculated by integrating the power before the power change over the predetermined time. The energy equality means not only precise energy equality but also energy equality including inevitable measurement error.

In a case in which the power of the incident light L changes at t=4750, energy calculated by integrating the power including the power change after the change over the interval of 1750 at t=4750 to 6500 is equal to energy calculated by integrating the power before the change over the interval of 1750 at t=3000 to 4750.

The case in which the power of the incident light L changes may include stop and resumption of incidence of the incident light L. The incident light L before the change may have power of a constant value over a predetermined time. In this case, the control unit 20 controls the incident light L after the change so that energy calculated by integrating the power of the incident light L including stop and resumption of the incident light L over the predetermined time becomes equal to energy calculated by integrating the constant value over the predetermined time.

Specifically, right after resumption of the incident light L, the control unit 20 adds power of the constant value to the power of the incident light L for a time equal to a stop time for which stop of the incident light L is executed. For example, right after resumption of the incident light L, the control unit 20 adds power of P=1.0 at t=5000 to 5250 corresponding to the interval of 250 equal to t=4750 to 5000 for which stop of incidence of the incident light L is executed. Accordingly, the power is P=2.0 in the interval of 250 at t=5000 to 5250. In this manner, stop of incidence of the incident light L can be compensated.

The timing at which power that compensates stop of the incident light L is added is desirably right after resumption of incidence. Accordingly, the temperature inside the housing 10 can be immediately returned to the original temperature. However, for a predetermined time since stop of incidence after resumption of incidence, the temperature inside the housing 10 is deviated from the original temperature for a while but can be returned to the original temperature.

The method of setting the stop time as a time to be added is employed as the method of compensating stop of the incident light L, but the present disclosure is not limited thereto. For example, power calculated by multiplying a constant value by a certain number may be added to the power of the incident light L for a time calculated by dividing a stop time for which stop of the incident light L is executed by the certain number. For example, stop of the incident light L is executed for the interval of 250 at t=4750 to 5000. The interval of 125 is calculated by dividing the stop time by two. Thus, power of P=2.0 may be added to the power of the incident light L in the interval of 125 at t=5000 to 5125 right after resumption of the incident light L. In this case, the sum of the power of the incident light L over t=5000 to 5125 is P=3.0. In this manner, in a predetermined time since stop after resumption of the incident light L, the control unit 20 may add power calculated by multiplying a constant value by a certain number to the power of the incident light L for a time calculated by dividing a stop time for which stop of the incident light L is executed by the certain number. The certain number may be an integer.

Figure 5:
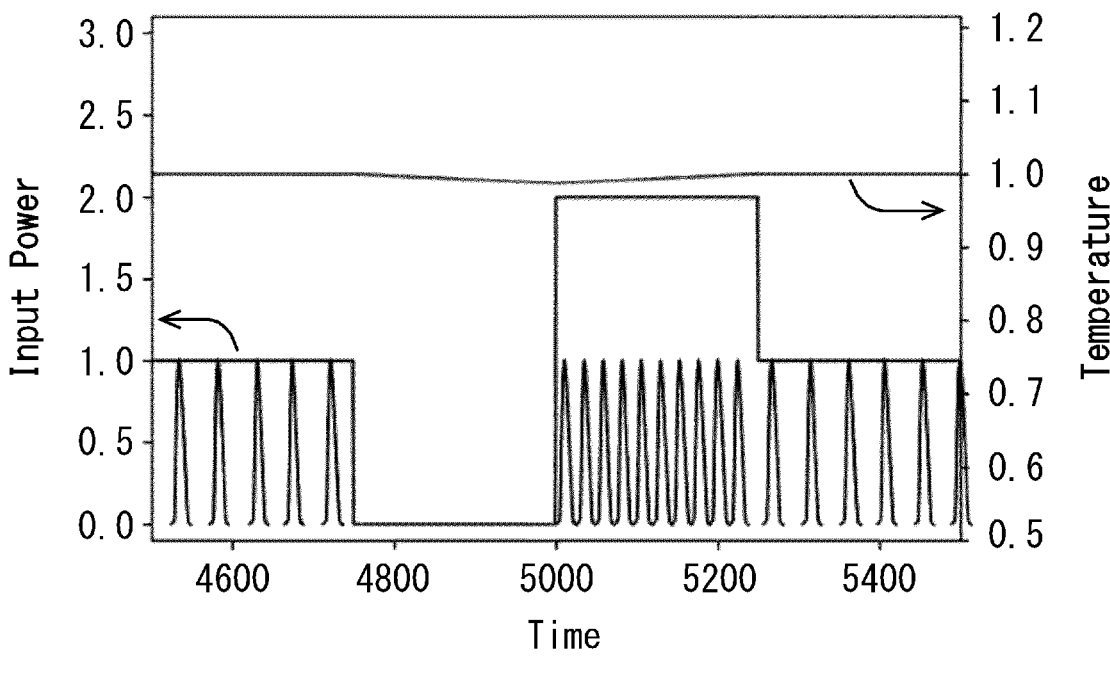
FIG. 5 is a graph exemplarily illustrating input power and temperature in the case in which the control unit performs incident light control in the optical apparatus according to the first embodiment, and is a diagram enlarging a vicinity of t=5000 in FIG. 4 and additionally including a pulse train included in incident light.
Figure 6:
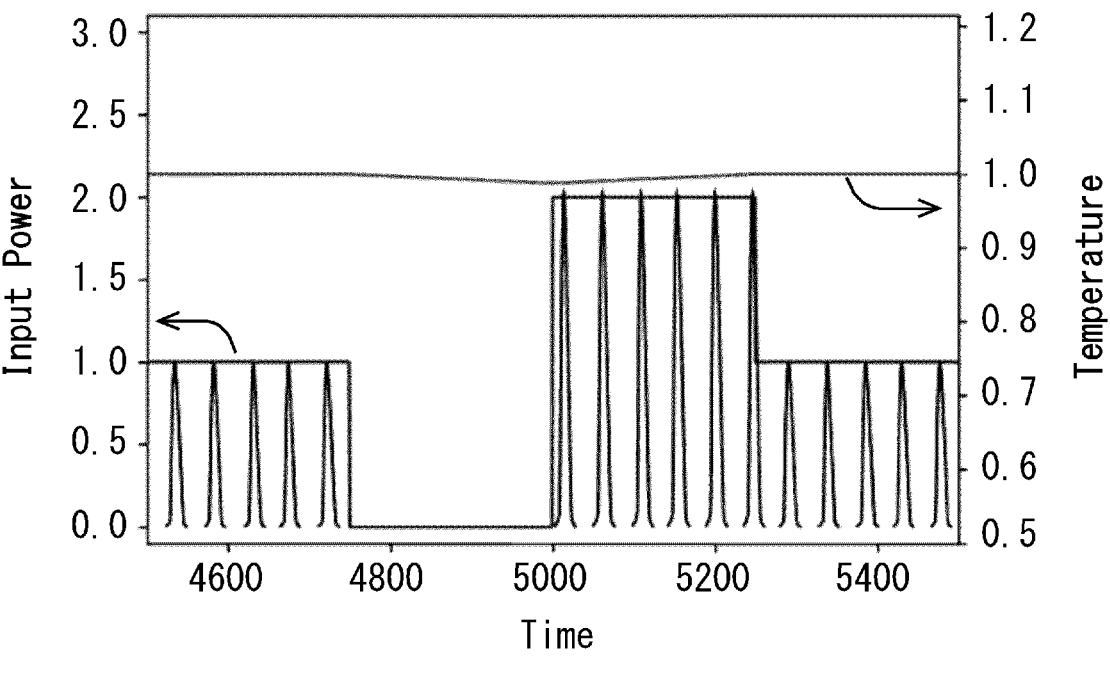
FIG. 6 is a graph exemplarily illustrating input power and temperature in the case in which the control unit performs incident light control in the optical apparatus according to the first embodiment, and is a diagram enlarging the vicinity of t=5000 in FIG. 4 and additionally including a pulse train included in incident light.

FIGS. 5 and 6 are graphs exemplarily illustrating input power and temperature in the case in which the control unit performs incident light control in the optical apparatus according to the first embodiment, and are diagrams enlarging a vicinity of t=5000 in FIG. 4 and additionally including a pulse train included in incident light. As illustrated in FIGS. 5 and 6, the incident light L may be pulse light including a pulse train with which a plurality of pulses are repeatedly incident. Right after resumption of the incident light L, the control unit 20 adds power corresponding to decrease of power right before the resumption from a constant value. In this case, as illustrated in FIG. 5, right after resumption of the incident light L, the control unit 20 may add the power corresponding to decrease from the constant value by increasing the repetition frequency of the pulse train. For example, in a case in which power calculated by doubling the constant value is to be added, the control unit 20 doubles the repetition frequency of the pulse train. As illustrated in FIG. 6, right after resumption of the incident light L, the control unit 20 may add the power corresponding to decrease from the constant value by increasing the intensity of the pulse train. For example, in a case in which power calculated by doubling the constant value is to be added, the control unit 20 doubles the intensity of the pulse train.

Figure 7:
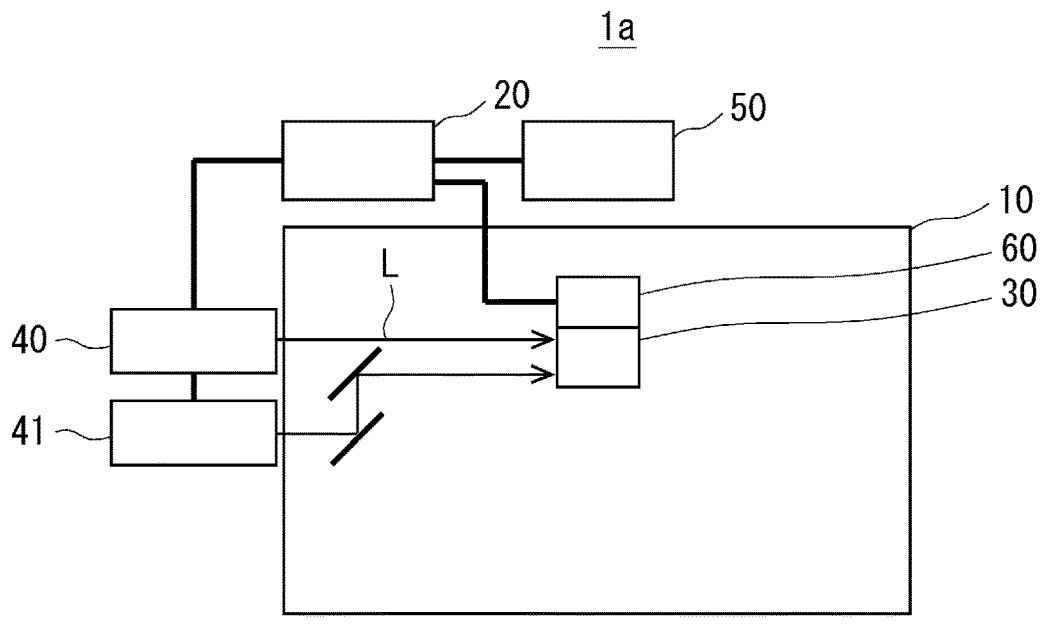
FIG. 7 is a configuration diagram exemplarily illustrating an optical apparatus according to a modification of the first embodiment.

FIG. 7 is a configuration diagram exemplarily illustrating an optical apparatus according to a modification of the first embodiment. As illustrated in FIG. 7, an optical apparatus 1a according to the modification includes an additional light source 41 in addition to the light source 40 configured to generate the incident light L. The additional light source 41 is another member different from the light source 40. The additional light source 41 generates additional light to be added to the power of the incident light L. Specifically, the additional light source 41 generates additional light for compensating stop of the incident light L described above. Since the additional light is generated by using the additional light source 41, the power of the light source 40 is not changed and thus the light source 40 can be stabilized. Change of the power of the incident light L is not limited to stop and resumption of incidence but may include decrease and increase of incident light. Specifically, change of the power of the incident light L is not limited to repetition of power P=0 and power P=1 but may be repetition of $0.0<P<1.0$ and $P\geq1$. In a case in which the incident light L is pulse light including a pulse train, the incident light L before changes may have power of a constant value over a predetermined time. The control unit 20 may control the pulse light after change of the power of the pulse light so that energy calculated by integrating the power of the pulse light after change over a predetermined time becomes equal to energy calculated by integrating a constant value before the change over the predetermined time.

For example, right after rise of each pulse train, the control unit 20 may add power corresponding to decrease of power right before rise of the pulse train. As described above, power corresponding to decrease of power due to, for example, stop of incidence of the incident light L at t=4750 to 5000, t=6500 to 6750, or t=8250 to 8500 may be added at t=5000 to 5250, t=6750 to 7000, or t=8500 to 8750 right after rise of each pulse train.

The optical apparatus 1 may further include the recording unit 50. The recording unit 50 records a parameter such as the power of the incident light L after change of the power in association with the power of the incident light L before the change. For example, the recording unit 50 records incidence of the incident light L with power P=2.0 for the interval of 250 as a parameter of the incident light L after t=250 after the incident light L with power P=1.0 is stopped.

The control unit 20 may control the incident light after change based on a parameter recorded in the recording unit 50.

The case in which the power of the incident light L changes may include a plurality of times of stop of incidence of the incident light L and resumption. In such a case, the control unit 20 controls the incident light L so that energy calculated by integrating the power of the incident light L including a plurality of times of stop and resumption of the incident light L over a predetermined time becomes equal to energy calculated by integrating, over the predetermined time, a constant value that the power before the change has for the predetermined time.

The temperature sensor 60 detects the temperature inside the housing 10. For example, the temperature sensor 60 detects the temperature of the optical member 30 such as a mirror, a mirror holder, a lens, a lens holder, or a stage. The temperature sensor 60 outputs the detected temperature inside the housing 10 to the control unit 20.

The control unit 20 may control the incident light L after change based on the temperature detected by the temperature sensor 60. For example, the recording unit 50 records addition of the incident light L with power P=1.0 when the temperature inside the housing 10 decreases by T=0.01. Accordingly, the control unit 20 performs control to add P=1.0 to the incident light L after change of the power based on the temperature detected by the temperature sensor 60.

Effects of the present embodiment will be described below. When the power of the incident light L has changed, the optical apparatus 1 according to the present embodiment controls the incident light L after the change so that energy calculated by integrating the power of the incident light L over a predetermined time is equal before and after the change. Specifically, for example, the power of the incident light L is temporarily increased in accordance with stop of the incident light L. Accordingly, the amount of input heat can be increased in accordance with the stop of the incident light L. Thus, thermal stability of the optical apparatus 1 can be improved.

The control unit 20 may add power by increasing the intensity of a pulse train included in the incident light L or may add power by increasing the repetition frequency of the pulse train. Alternatively, the control unit 20 may add power by combining the intensity and repetition frequency of the pulse train. In this manner, power addition is controlled by the control unit 20, and thus the amount of input heat can be highly accurately controlled.

In addition to the method of increasing the power of single incident light L, a method of using a plurality of incident lights L emitted from the light source 40, the additional light source 41, and the like as in the modification may be employed as the method of increasing the power of the incident light L. In a case in which the power of the incident light L is controlled to compensate stop of the incident light L, the stop time may be set as a time to be increased. Alternatively, additional light with doubled power may be added to the incident light L for half of a stop time for which the incident light L is stopped (as a result, the power is tripled). Accordingly, the power of the light source 40 does not need to be changed and thus stability is improved.

Figure 8:
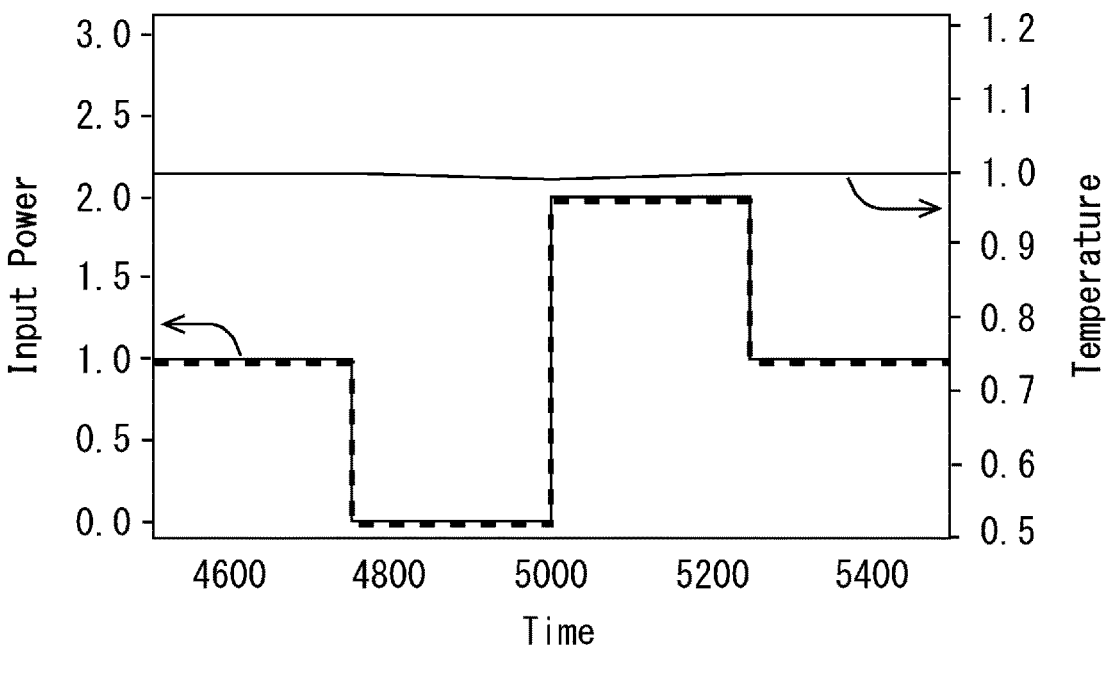
FIG. 8 is a graph exemplarily illustrating input power and temperature in the case in which the control unit performs control of incident light L in the optical apparatus according to the first embodiment.

The incident light L incident on the housing 10 of the optical apparatus 1 may be continuous light or pulse light. FIG. 8 is a graph exemplarily illustrating input power and temperature in the case in which the control unit 20 performs control of the incident light L in the optical apparatus 1 according to the first embodiment. In FIG. 8, the intensity (no scale is illustrated) of the incident light L is illustrated with a dotted line. As illustrated in FIG. 8, the incident light L may be continuous light that continuously oscillates through change of input power. Alternatively, the incident light L may change, through change of input power, from continuous light to pulse light or from pulse light to continuous light. Accordingly, the freedom of usage of the optical apparatus 1 can be improved. For example, the optical apparatus 1 is applicable to an examination apparatus configured to examine an examination target with the incident light L.

The recording unit 50 of the optical apparatus 1 records, in advance, parameters of the incident light L after power change in association with power before the change. Thus, change of the power of the incident light L can be swiftly handled. Accordingly, thermal stability of the optical apparatus 1 can be improved.

Second Embodiment

Figure 9:
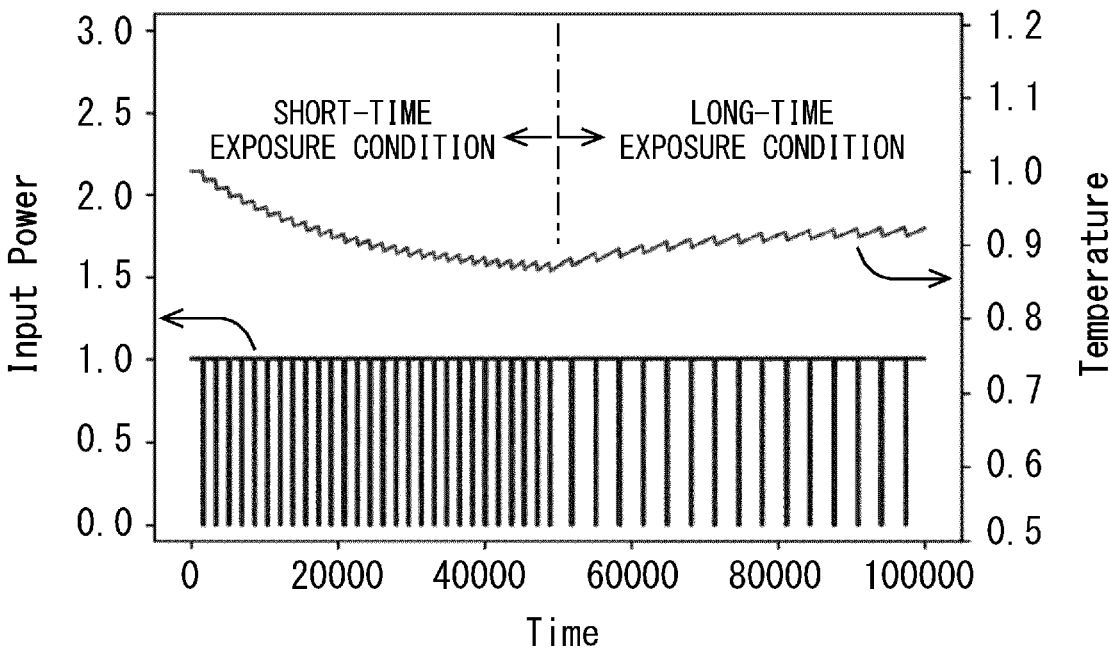
FIG. 9 is a graph exemplarily illustrating input power and temperature in a case in which the control unit does not perform incident light control in an optical apparatus according to a second embodiment, a horizontal axis representing time, a vertical axis on a left side representing the power of incident light incident on the housing, a vertical axis on a right side representing the temperature inside the housing.

An optical apparatus according to a second embodiment will be described below. The optical apparatus according to the present embodiment handles a case in which the repetition frequency of pulse light changes and a case in which a period of stop and resumption of the incident light L changes as well as a case in which the power of the incident light L changes. FIG. 9 is a graph exemplarily illustrating input power and temperature in a case in which the control unit 20 does not perform control of the incident light L in the optical apparatus according to the second embodiment, a horizontal axis representing time, a vertical axis on a left side representing the power of incident light incident on the housing, a vertical axis on a right side representing the temperature inside the housing.

As illustrated in FIG. 9, in the optical apparatus 1 according to the present embodiment, the incident light L includes a plurality of pulse trains. The power of the incident light L changes in the optical apparatus 1 as well. Change of the power of the incident light L according to the present embodiment includes two changes. The first change is stop and resumption of the incident light L. Each period including one pulse train in the incident light L includes stop and resumption of the incident light L. The second change is change of the period of stop and resumption of the incident light L. The incident light L includes a short-time exposure condition and a long-time exposure condition between which the period of stop and resumption of incidence is different.

Until t=50000, the optical apparatus 1 causes the incident light L to be incident on the housing 10 under the short-time exposure condition. From t=50000, the optical apparatus 1 causes the incident light L to be incident on the housing 10 under the long-time exposure condition. The incident light L may include pulse trains under each condition.

Under the short-time exposure condition, for example, the incident light L is stopped for the interval of 100 in the period of t=1650. Specifically, stop of the incident light L (the interval of 100) and incidence of the incident light L with power P=1.0 (the interval of 1550) are repeated. Under the short-time exposure condition, the incident light L includes a plurality of pulse trains having a width of the interval of 1550 at power P=1.0. Under the short-time exposure condition, the power of the incident light L changes from P=1.0 in each period.

Under the short-time exposure condition, the temperature inside the housing 10 decreases each time the incident light L is stopped. For example, the temperature inside the housing 10, which is T=1.0 at t=0, decreases to T=0.87 at t=50000. In this manner, the temperature inside the housing 10 gradually decreases under the short-time exposure condition.

Under the short-time exposure condition, each period including one pulse train includes stop and resumption of the incident light L. A pulse train is incident at resumption of incidence. Energy calculated by integrating the power of incident light including stop and resumption of incidence over a predetermined time is different from energy calculated by integrating the power before the stop of incidence over the predetermined time. Specifically, for example, energy calculated through integration over the interval of 200 including the interval of 100 at stop of incidence and the interval of 100 after resumption is different from energy calculated through integration over the interval of 200 before the stop of incidence.

Under the long-time exposure condition, for example, the incident light L is stopped for the interval of 100 in the period of t=3300. Specifically, stop of the incident light L (the interval of 100) and incidence of the incident light L with power P=1.0 (the interval of 3200) are repeated. Under the long-time exposure condition, the incident light L includes a plurality of pulse trains having a width of the interval of 3200 at power P=1.0. Under the long-time exposure condition as well, the power of the incident light L changes from P=1.0 in each period.

Under the long-time exposure condition, the temperature inside the housing 10 increases each time incidence of the incident light L is resumed. For example, the temperature inside the housing 10, which is T=0.87 at t=50000, increases to T=0.93 at t=100000. In this manner, the temperature inside the housing 10 gradually increases under the long-time exposure condition. However, the temperature inside the housing 10 does not recover to T=1.0 at which incidence of the incident light L is started.

Under the long-time exposure condition, each period including one pulse train includes stop and resumption of the incident light L. A pulse train is incident at resumption of incidence. Energy calculated by integrating the power of incident light including stop and resumption of incidence over a predetermined time is different from energy calculated by integrating the power before the stop of incidence over the predetermined time. Specifically, for example, energy calculated through integration over the interval of 200 including the interval of 100 at stop of incidence and the interval of 100 after resumption is different from energy calculated through integration over the interval of 200 before the stop of incidence.

In this manner, energy calculated through integration over a predetermined time is different between before and after the first change, in other words, change of the power of the incident light L at one pulse train under any of the short-time exposure condition and the long-time exposure condition.

In addition, the second change, in other words, energy calculated by integrating, over a predetermined time, the power of the incident light L under the short-time exposure condition and the long-time exposure condition between which the period of stop and resumption of the incident light L is different is different. Specifically, energy calculated by integrating the power of the incident light L over t=0 to 50000 under the short-time exposure condition is different from energy calculated by integrating the power of the incident light L over t=50000 to 100000 under the long-time exposure condition.

Thus, in the case in which the control unit 20 does not perform control of the incident light L, energy calculated by integrating the power of the incident light L over a predetermined time is different between before and after the power of the incident light L changes. Specifically, the amount of input heat changes in accordance with the ratio of stop of incidence of the incident light L and resumption. Moreover, the amount of input heat changes in accordance with the period of stop and resumption of the incident light L. In the case in which the control unit 20 does not perform control of the incident light L, it is difficult to stabilize the temperature inside the housing 10 under any of the short-time exposure condition and the long-time exposure condition.

Figure 10:
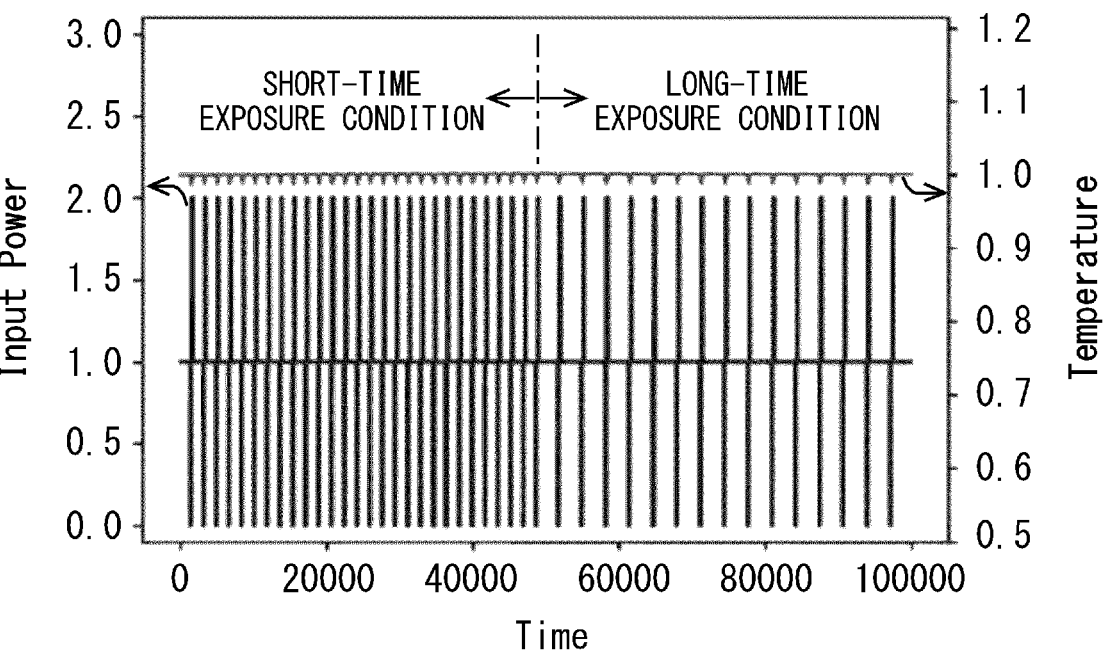
FIG. 10 is a graph exemplarily illustrating input power and temperature in a case in which the control unit performs incident light control in the optical apparatus according to the second embodiment, a horizontal axis representing time, a vertical axis on a left side representing the power of incident light incident on the housing, a vertical axis on a right side representing the temperature inside the housing.

FIG. 10 is a graph exemplarily illustrating input power and temperature in a case in which the control unit 20 performs control of the incident light L in the optical apparatus 1 according to the second embodiment, a horizontal axis representing time, a vertical axis on a left side representing the power of the incident light L incident on the housing 10, a vertical axis on a right side representing the temperature inside the housing 10.

As illustrated in FIG. 10, in the optical apparatus 1 according to the present embodiment as well, a plurality of pulse trains are repeatedly incident with the incident light L. In the present embodiment as well, the power of the incident light L changes. Change of the power of the incident light L includes two changes as in FIG. 9. The first change is stop of incidence of the incident light L and resumption. The second change is change of the period of stop and resumption of the incident light L.

Until t=50000, the optical apparatus 1 causes the incident light L to be incident on the housing 10 under the short-time exposure condition. From t=50000, the optical apparatus 1 causes the incident light L to be incident on the housing 10 under the long-time exposure condition. The period of stop and resumption of the incident light L is different between the short-time exposure condition and the long-time exposure condition.

Under the short-time exposure condition, for example, the incident light L is stopped for the interval of 100 in the period of t=1650. Then, the incident light L with power P=2.0 is incident for the interval of 100 right after resumption. Thereafter, the incident light with power P=1.0 is incident. Specifically, stop of the incident light L (the interval of 100), incidence of the incident light L with power P=2.0 (the interval of 100), and incidence of the incident light L with power P=1.0 (the interval of 1450) are repeated. Under the short-time exposure condition, the incident light L includes a plurality of pulse trains having a width of the interval of 1550 at power P=2.0 and P=1.0. Under the short-time exposure condition, the power of the incident light L changes from P=1.0 with stop of the incident light L in each period.

Under the short-time exposure condition in the case in which the control unit 20 performs control, the temperature inside the housing 10 decreases each time incidence of the incident light L is stopped. However, the temperature inside the housing 10 returns to the original temperature each time the incident light L with power 2.0 is incident to compensate stop of light emission after incidence of the incident light L is resumed.

For example, the temperature before stop of the incident light L is defined to be T=1.0. Specifically, the temperature inside the housing 10 when the incident light L with power P=1.0 is incident is defined to be T=1.0. The temperature decreases by 0.01 with stop of the incident light L in the interval of 100. However, the temperature increases by 0.01 with incidence of the incident light L with power P=2.0 in the interval of 100 right after resumption of the incident light L. Accordingly, the temperature inside the housing 10 returns to the original temperature T=1.0. Then, the temperature inside the housing 10 is maintained at T=1.0 with incidence of the incident light L with power P=1.0 in the interval of 1450.

Under the short-time exposure condition, each period including one pulse train includes stop and resumption of the incident light L. Energy calculated by integrating the power of the incident light L including stop and resumption of incidence over a predetermined time is equal to energy calculated by integrating the power before the stop of incidence over the predetermined time.

Specifically, for example, energy calculated through integration over the interval of 200 including the interval of 100 at stop of incidence and the interval of 100 with power P=2.0 after resumption is equal to energy calculated through integration over the interval of 200 before the stop of incidence. Right after rise of each pulse train, the control unit 20 adds power corresponding to decrease of power right before rise of the pulse train. In this manner, the control unit 20 equalizes energy before and after power change.

Under the long-time exposure condition, for example, the incident light L is stopped for the interval of 100 in the period of t=3300. Then, the incident light L with power P=2.0 is incident for the interval of 100 right after resumption. Thereafter, incident light with power P=1.0 is incident. Specifically, stop of the incident light L (the interval of 100), incidence of the incident light L with power P=2.0 (the interval of 100), and incidence of the incident light L with power P=1.0 (the interval of 3100) are repeated. Under the long-time exposure condition, the incident light L includes a plurality of pulse trains having a width of the interval of 3200 at power P=2.0 and P=1.0. Under the long-time exposure condition, the power of the incident light L changes from P=1.0 with stop of the incident light L in each period.

Under the long-time exposure condition in the case in which the control unit 20 performs control, the temperature inside the housing 10 decreases each time incidence of the incident light L is stopped. However, the temperature inside the housing 10 returns to the original temperature each time the incident light L with power 2.0 is incident to compensate stop of light emission after incidence of the incident light L is resumed.

For example, the temperature before stop of the incident light L is defined to be T=1.0. Specifically, the temperature inside the housing 10 when the incident light L with power P=1.0 is incident is defined to be T=1.0. The temperature decreases by 0.01 with stop of the incident light L in the interval of 100. However, the temperature increases by 0.01 with incidence of the incident light L with power P=2.0 in the interval of 100 right after resumption of the incident light L. Accordingly, the temperature inside the housing 10 returns to the original temperature T=1.0. Then, the temperature inside the housing 10 is maintained at T=1.0 with incidence of the incident light L with power P=1.0 in the interval of 3100.

Under the long-time exposure condition, each period including one pulse train includes stop and resumption of the incident light L. Energy calculated by integrating the power of the incident light L including stop and resumption of incidence over a predetermined time is equal to energy calculated by integrating the power before the stop of incidence over the predetermined time.

Specifically, for example, energy calculated through integration over the interval of 200 including the interval of 100 at stop of incidence and the interval of 100 with power P=2.0 after resumption is equal to energy calculated through integration over the interval of 200 before the stop of incidence. Right after rise of each pulse train, the control unit 20 may add power corresponding to decrease of power right before rise of the pulse train. In this manner, the control unit 20 equalizes energy before and after power change.

In this manner, under any of the short-time exposure condition and the long-time exposure condition, energy calculated by integrating the power after the first change, in other words, change of the power of the incident light L at one pulse train over a predetermined time is equal to energy calculated by integrating the power before the change over the predetermined time.

In addition, the second change, in other words, energy calculated by integrating the power of the incident light L under the short-time exposure condition and the long-time exposure condition, between which the period of stop and resumption of the incident light L is different, over a predetermined time is equal as well. The control unit 20 controls the incident light L after the period change so that energy calculated by integrating the power of the pulse light after change of the period of stop and resumption of the incident light L over a predetermined time becomes equal to energy calculated by integrating the power of the pulse light before the period change over the predetermined time. Specifically, for example, energy calculated by integrating the power of the incident light L over t=0 to 50000 under the short-time exposure condition is equal to energy calculated by integrating the power of the incident light L over t=50000 to 100000 under the long-time exposure condition.

Thus, in the case in which the control unit 20 performs control of the incident light L, the control unit 20 performs control so that energy calculated by integrating the power of the incident light L over a predetermined time is equal between before and after change of the power of the incident light L. The control unit 20 controls the incident light L after the power change so that the amount of input heat becomes equal in accordance with the ratio of stop and resumption of the incident light L. Moreover, the control unit 20 controls the incident light L so that the amount of input heat becomes equal in accordance with the period of stop and resumption of the incident light L. The control unit 20 controls a predetermined time including stop and resumption of the incident light L.

Effects of the present embodiment will be described below. The incident light L with which a plurality of pulse trains are repeatedly incident are incident in the optical apparatus 1 according to the present embodiment. Accordingly, the case in which the power of the incident light L changes includes change of the period of stop and resumption of the incident light L. In such a case as well, the control unit 20 can perform control so that energy calculated through integration over a predetermined time is equal between before and after the power of the incident light L changes. Thus, thermal stability of the optical apparatus 1 can be improved.

Change of the power of the incident light L may include not only stop and resumption of the incident light L but also decrease of the power of the incident light L and increase of the power. In such a case as well, the control unit 20 may control the incident light after change so that energy calculated by integrating the power after the change over a predetermined time becomes equal to energy calculated by integrating the power before the change over the predetermined time. Other configurations and effects are included in the description of the first embodiment.

Although the embodiments of the present disclosure are described above, the present disclosure includes appropriate modifications without losing its intention and advantages and is not limited by the above-described embodiments. Moreover, the configurations of the first and second embodiments may be combined as appropriate.

The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An optical apparatus comprising:
a housing that includes an optical member in an interior space of the housing, and where light is incident on at least one of the interior space and the optical member;
a control unit configured to control a change in power of incident light, in a case in which power of incident light incident on the housing changes as detected by a recording unit, the incident light after the change so that the control unit calculates the energy via integrating the power after the change over a predetermined time becomes equal to energy calculated by integrating the power before the change over a time of the same length as the predetermined time, wherein
the case in which the power of the incident light changes includes stop and resumption of incidence of the incident light,
the incident light before the change has the power of a constant value over the time of the same length as the predetermined time, and
the control unit controls the incident light after the change so that energy calculated by integrating the power of the incident light including the stop and the resumption over the predetermined time becomes equal to energy calculated by integrating the constant value over the time of the same length as the predetermined time.

2. The optical apparatus according to claim 1, wherein right after the resumption of the incident light, the control unit adds the constant value to the power of the incident light for a time equal to a stop time for which the stop of the incident light is executed.

3. The optical apparatus according to claim 1, wherein in the predetermined time since the stop after the resumption of the incident light, the control unit adds the power calculated by multiplying the constant value by a certain number to the power of the incident light for a time calculated by dividing a stop time for which the stop of the incident light is executed by the certain number.

4. The optical apparatus according to claim 2, further comprising:
a light source configured to generate the incident light; and
an additional light source different from the light source and configured to generate additional light to be added to the power of the incident light.

5. The optical apparatus according to claim 1, wherein the incident light is pulse light including a pulse train with which a plurality of pulses is repeatedly incident, and right after the resumption, the control unit adds the power corresponding to decrease of the power right before the resumption from the constant value.

6. The optical apparatus according to claim 5, wherein right after the resumption, the control unit adds the power corresponding to decrease from the constant value by increasing intensity of the pulse train.

7. The optical apparatus according to claim 5, wherein right after the resumption, the control unit adds the power corresponding to decrease from the constant value by increasing repetition frequency of the pulse train.

8. The optical apparatus according to claim 5, wherein the control unit controls the predetermined time including the stop and the resumption.

9. The optical apparatus according to claim 1, wherein the recording unit configured to record a parameter such as the power of the incident light after the change in association with the power before the change, wherein the control unit controls the incident light after the change based on the parameter recorded in the recording unit.

10. The optical apparatus according to claim 1, further comprising a temperature sensor configured to detect temperature inside the housing, wherein the control unit controls the incident light after the change based on the temperature detected by the temperature sensor.

11. An examination apparatus comprising the optical apparatus according to claim 1 and configured to examine an examination target with the incident light.

12. An optical apparatus comprising:
a housing that includes an optical member in an interior space of the housing, and where light is incident on at least one of the interior space and the optical member;
a control unit configured to control a change in power of incident light, in a case in which power of incident light incident on the housing changes, the incident light after the change so that energy calculated by integrating the power, via the control unit after the change over a predetermined time becomes equal to energy calculated by integrating the power before the change over a time of the same length the predetermined time, wherein
the case in which the power of the incident light changes includes stop and resumption of incidence of the incident light, the incident light before the change has the power of a constant value over the predetermined time, and the control unit controls the incident light after the change so that energy calculated by integrating the power of the incident light including the stop and the resumption over the predetermined time becomes equal to energy calculated by integrating the constant value over the predetermined time, wherein right after the resumption of the incident light, the control unit adds the constant value to the power of the incident light for a time equal to a stop time for which the stop of the incident light is executed.

13. The optical apparatus according to claim 12, further comprising:

a light source configured to generate the incident light; and an additional light source different from the light source and configured to generate additional light to be added to the power of the incident light.

14. The optical apparatus according to claim 12, further comprising a recording unit configured to record a parameter such as the power of the incident light after the change in association with the power before the change, wherein the control unit controls the incident light after the change based on the parameter recorded in the recording unit.

15. The optical apparatus according to claim 12, further comprising a temperature sensor configured to detect temperature inside the housing, wherein the control unit controls the incident light after the change based on the temperature detected by the temperature sensor.

16. An examination apparatus comprising the optical apparatus according to claim 12 and configured to examine an examination target with the incident light.

17. An optical apparatus comprising:

a housing that includes an optical member in an interior space of the housing, and where light is incident on at least one of the interior space and the optical member;

a control unit configured to control a change in power of incident light, in a case in which power of incident light incident on the housing changes, the incident light after the change so that energy calculated by integrating the power, via the control unit after the change over a predetermined time becomes equal to energy calculated by integrating the power before the change over a time of the same length the predetermined time, wherein the case in which the power of the incident light changes includes stop and resumption of incidence of the incident light, the incident light before the change has the power of a constant value over the predetermined time, and the control unit controls the incident light after the change so that energy calculated by integrating the power of the incident light including the stop and the resumption over the predetermined time becomes equal to energy calculated by integrating the constant value over the predetermined time, wherein in the predetermined time since the stop after the resumption of the incident light, the control unit adds the power calculated by multiplying the constant value by a certain number to the power of the incident light for a time calculated by dividing a stop time for which the stop of the incident light is executed by the certain number.

18. An optical apparatus comprising:

a housing that includes an optical member in an interior space of the housing, and where light is incident on at least one of the interior space and the optical member;

a control unit configured to control a change in power of incident light, in a case in which power of incident light incident on the housing changes, the incident light after the change so that energy calculated by integrating the power, via the control unit after the change over a predetermined time becomes equal to energy calculated by integrating the power before the change over a time of the same length the predetermined time, wherein the case in which the power of the incident light changes includes stop and resumption of incidence of the incident light, the incident light before the change has the power of a constant value over the predetermined time, and the control unit controls the incident light after the change so that energy calculated by integrating the power of the incident light including the stop and the resumption over the predetermined time becomes equal to energy calculated by integrating the constant value over the predetermined time, wherein the incident light is pulse light including a pulse train with which a plurality of pulses is repeatedly incident, and right after the resumption, the control unit adds the power corresponding to decrease of the power right before the resumption from the constant value.

19. The optical apparatus according to claim 18, wherein right after the resumption, the control unit adds the power corresponding to decrease from the constant value by increasing intensity of the pulse train.

20. The optical apparatus according to claim 18, wherein right after the resumption, the control unit adds the power corresponding to decrease from the constant value by increasing repetition frequency of the pulse train.

21. The optical apparatus according to claim 18, wherein the control unit controls the predetermined time including the stop and the resumption.

* * * * *